United States Patent [19]

Teraoka

[11] Patent Number: 5,282,775

[45] Date of Patent: * Feb. 1, 1994

[54] PLANETARY GEAR TYPE DIFFERENTIAL APPARATUS

[75] Inventor: Masao Teraoka, Tochigi, Japan

[73] Assignee: Tochigifujisangyo Kabushiki Kaisha, Tochigi, Japan

[*] Notice: The portion of the term of this patent subsequent to May 11, 2010 has been disclaimed.

[21] Appl. No.: 795,113

[22] Filed: Nov. 19, 1991

[30] Foreign Application Priority Data

Nov. 20, 1990 [JP] Japan .................................. 2-312758

[51] Int. Cl.$^5$ .............................................. F16H 1/42
[52] U.S. Cl. ...................................... 475/252; 475/248
[58] Field of Search ............................... 475/252, 248

[56] References Cited

U.S. PATENT DOCUMENTS

| | | | |
|---|---|---|---|
| 2,269,734 | 1/1942 | Powell | 475/252 |
| 3,343,429 | 9/1967 | Frost | |
| 3,412,632 | 11/1968 | McFiggans | 475/252 X |
| 3,768,336 | 10/1973 | Wharton | 475/252 |
| 5,078,660 | 1/1992 | Williams et al. | 475/252 X |
| 5,083,987 | 1/1992 | Körner et al. | 475/252 X |

Primary Examiner—Leslie A. Braun
Assistant Examiner—Daniel Wittels
Attorney, Agent, or Firm—Graham & James

[57] ABSTRACT

A differential apparatus of planetary gear type comprises an internal gear, and a sun gear on the side of an axle. Each of a plurality of pinion-gear sets has an even number of pinion gears rotated in mesh with each other. Ones of the pinion gears on the outside are in mesh with the internal gear, while the remaining pinion gears on the inside are in mesh with the sun gear. A pinion carrier rotatably supports the pinion gears. A torque is inputted from one of the internal gear and the sun gear. A rotating frictional force between the pinion gears on the torque output side and the pinion carrier is reduced less than those of each of the remaining pinion gears.

13 Claims, 6 Drawing Sheets

PLANETARY GEAR TYPE DIFFERENTIAL APPARATUS

BACKGROUND OF THE INVENTION

This invention relates to a differential apparatus for use in a vehicle.

"A differential-limiting type differential apparatus" is disclosed in Japanese Utility Model Laid-Open Publication (Kokai) No. 1-166157. This apparatus is a planetary-gear differential apparatus of double-pinion type, which is provided with a differential limiting mechanism. A drive force of an engine is inputted to an internal gear, and is divided into left- and right-hand driving axles from pinion carriers and a sun gear.

In the case of the above-described publication, however, differential limiting means includes a multiple disc clutch between a differential case and a planetary carrier. For this reason, there are problems that a structure or construction is complicated, and the apparatus is large-sized.

In order to dissolve the above-mentioned problems, applicant of the present invention has previously filed Japanese Patent Application No. 2-188136.

Figure 1:
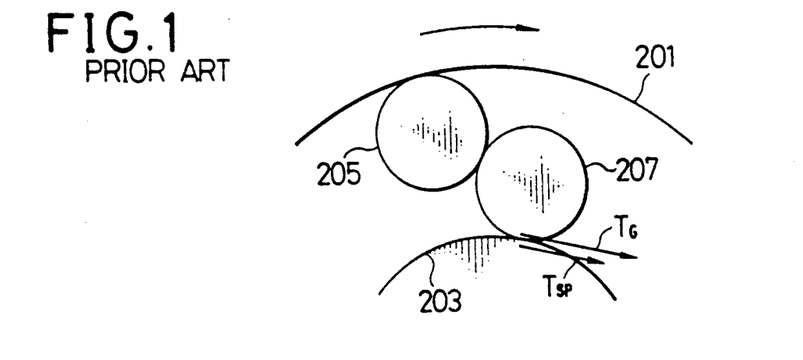
FIG. 1 is a view for explanation of a torque which occurs on a sun gear, in the prior art.

As shown in FIG. 1, it is assumed that, when an internal gear 201 is rotatively driven in an arrowed direction, and when a wheel on the side of a sun gear 203 is idle-run, a torque (idle-running torque) applied to the sun gear 203 is $T_{SP}$, while a torque (grip torque) applied to the sun gear 203 when the wheel on the side of a pinion carrier is idle-run is $T_G$. Then, $T_G$ remarkably increases more larger than $T_{SP}$ by a driving resistance inputted from the wheel on the side of the sun gear 203.

Further, a resultant force of a drive torque and a reaction force thereof acts upon each of rotating sections of pinion gears 205 and 207 and pinion carrier. A rotating resistance (differential limiting force) due to a frictional force in accordance with a magnitude of the resultant force is generated on each of the rotating sections.

Accordingly, the differential limiting force is large when the wheel on the carrier side is idle-run, while the differential limiting force is small when the wheel on the sun gear side is idle-run. Thus, an unbalance in strength of the differential limiting force occurs between the left-and right-hand wheels, so that a pull of differential limiting occurs. Furthermore, since the differential limiting force is in proportion to the frictional forces of the respective rotating sections, the pull becomes more remarkable the more the differential limiting force increases. In the case where the torque is inputted from the sun gear, such pull occurs on the side of the internal gear.

As the differential limiting force increases, a torque distribution ratio (transfer ratio) between the idle-running side at the time one of the driving wheels is idle-run and the other driving-wheel side, so that rough-road bailing-out or escaping performance is improved. If, however, the transfer ratio increases as described above, a pull of differential limiting between the left- and right-hand wheels increases so that the rough-road bailing-out performance in the case where the wheel on the side of the sun gear is idle-run decreases. Thus, an unbalance occurs in cornering characteristic between left turn and right turn. An unbalance in direct or rectilinear advance stability also occurs between the right-hand direction and the left-hand direction. Accordingly, maneuvering stability is remarkably reduced.

SUMMARY OF THE INVENTION

It is therefore an object of the invention to provide a differential apparatus in which, even if a transfer ratio increases, there is less pull of differential limiting.

According to a first invention, there is provided a differential apparatus of planetary gear type, comprising:

an internal gear;

a sun gear on the side of an axle;

a plurality of pinion-gear sets each having an even number of pinion gears rotated in mesh with each other, ones of said pinion gears on the outside being in mesh with said internal gear, while the remaining pinion gears on the inside are in mesh with said sun gear; and a pinion carrier for rotatably supporting said pinion gears, wherein a torque is inputted from one of said internal gear and said sun gear, and wherein a rotating frictional force between the pinion gears on the torque output side and said pinion carrier is reduced less than those of each of the remaining pinion gears.

According to a second invention, there is provided a differential apparatus characterized in that rotating sections of the pinion gears on the torque output side are smaller in diameter than rotating sections of the remaining pinion gears.

According to a third invention, there is further provided a differential apparatus characterized in that a coefficient of friction of the rotating section of each of the pinion gears on the torque output side is smaller than that of each of the remaining pinion gears.

With the arrangement of the invention, in the differential apparatus of planetary-gear type in which the drive force of the engine is inputted from the internal gear or the sun gear, a driving resistance is inputted to the pinion-gear sets from the side of the sun gear or from the side of the internal gear. The larger affection or influence of the driving resistance the nearer the pinion gears on the torque output side by a friction loss between the gears, and the smaller the influence the nearer the other pinion gears.

In view of the above, according to the first invention, in order to reduce the influence of the drive resistance with respect to the frictional force between the pinion gears and the pinion carrier, the smaller the frictional force of each of the rotating sections the nearer the pinion gears on the torque output side. Accordingly, a pull of differential limiting can be reduced under a condition that a transfer ratio is raised. Further, according to the second invention, in order to produce such advantage, the rotating sections of the pinion gears on the torque output side are reduced in diameter less than the other pinion gears. According to the third invention, the coefficient of friction of each of the rotating sections of the pinion gears on the torque output side is reduced less than that of each of the other pinion gears.

DETAILED DESCRIPTION OF THE PREFERRED EMBODIMENTS

Figure 2:
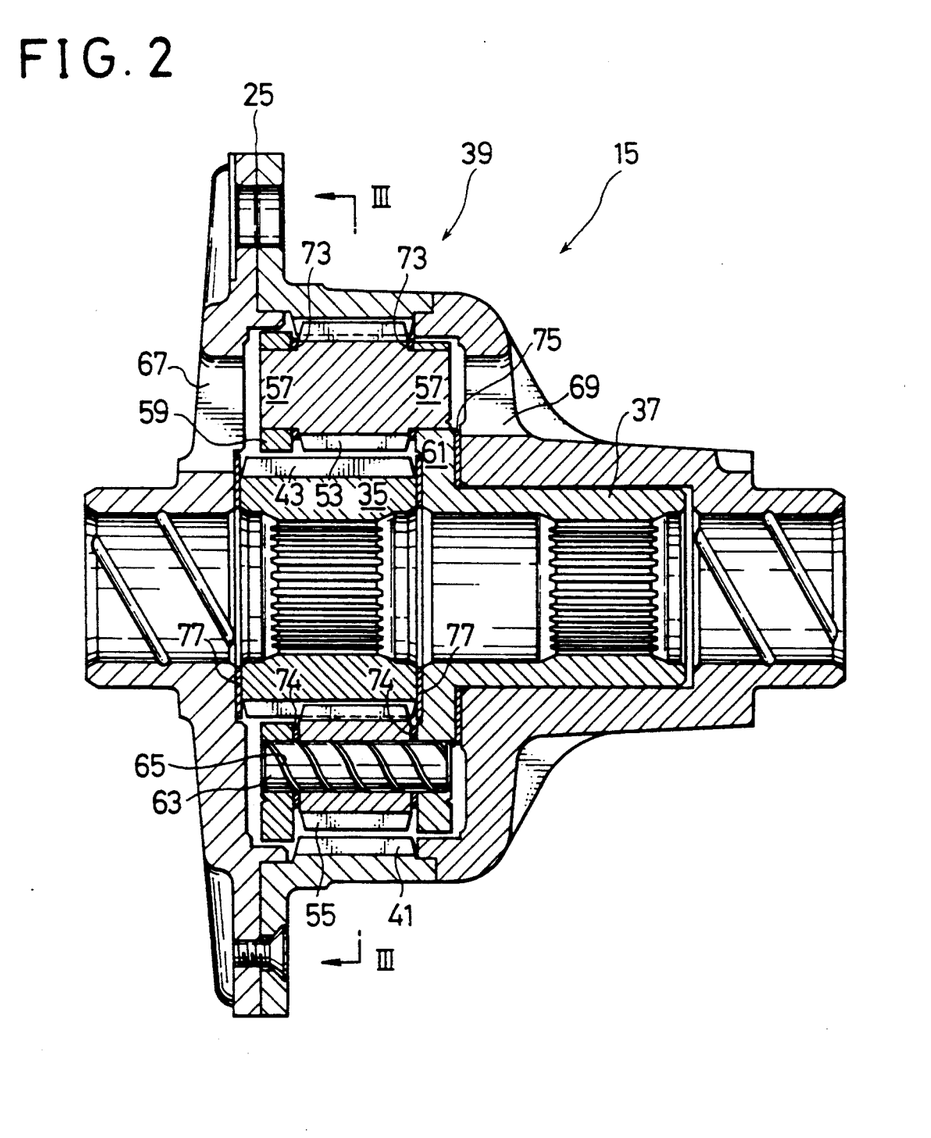
FIG. 2 is a longitudinal cross-sectional view of a first embodiment of the invention.
Figure 4:
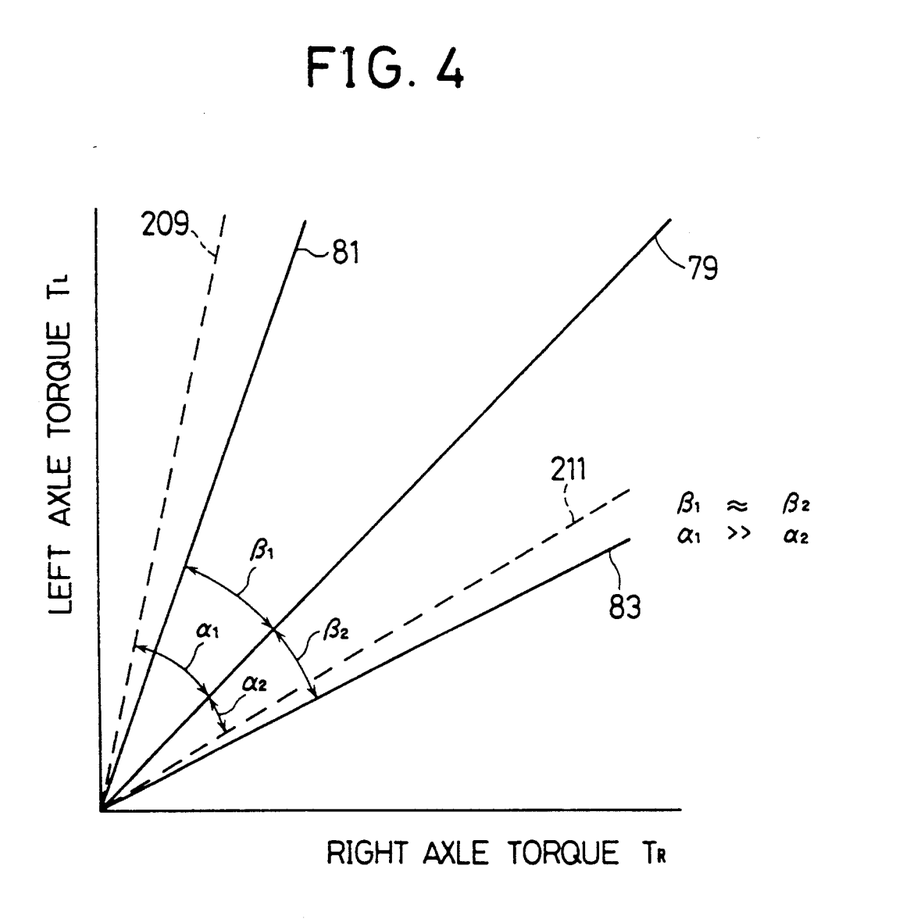
FIG. 4 is a view of torque distribution characteristics of the first embodiment and a conventional example.
Figure 5:
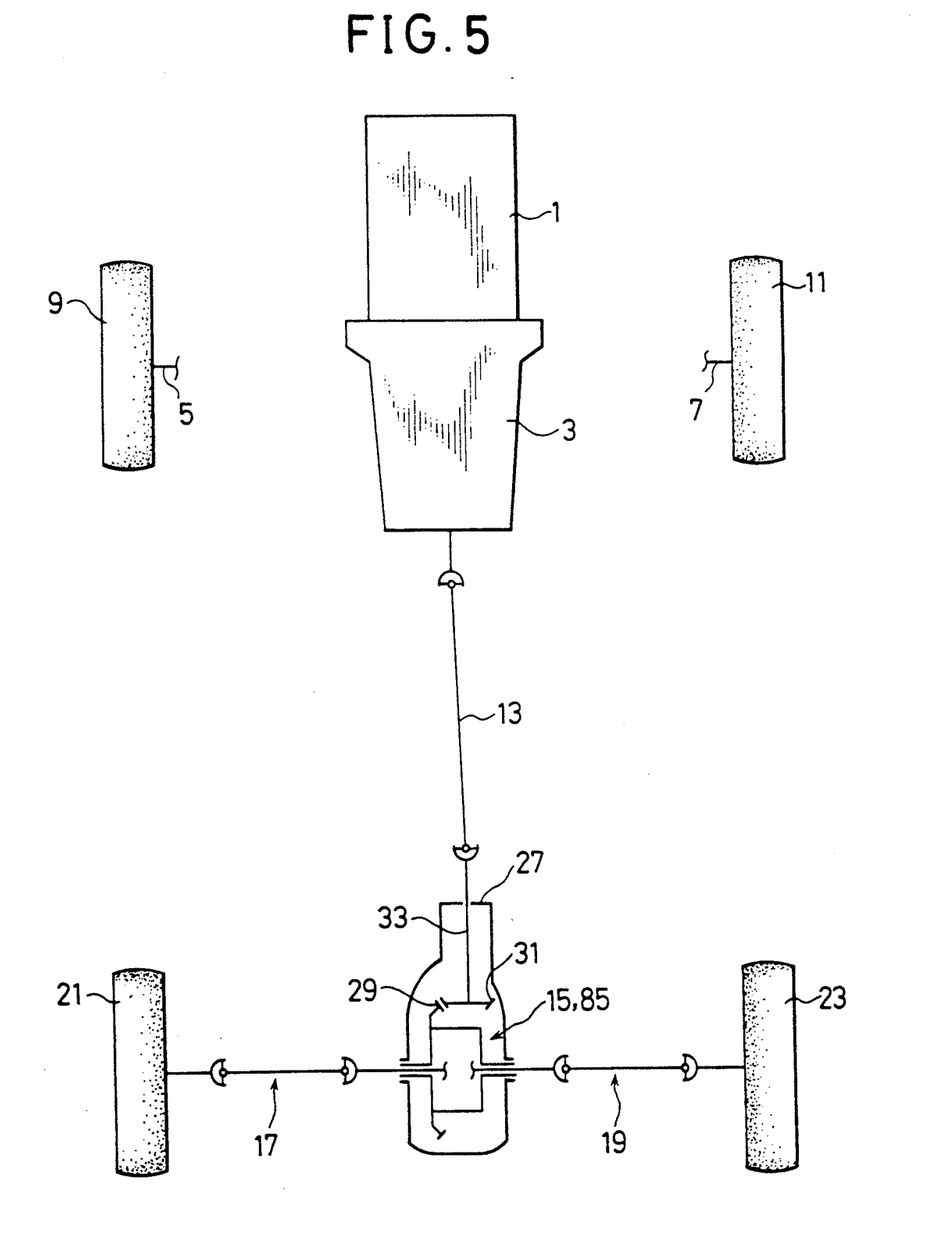
FIG. 5 is a skeleton mechanism view showing a power system of a vehicle which uses each embodiment according to the invention.

A first embodiment of the invention (second invention) will be described with reference to FIGS. 2 through 5. FIG. 2 shows a differential apparatus according to this embodiment, while FIG. 5 shows a power system of a vehicle which uses the differential apparatus. Left- and right-hand directions will hereunder indicate left- and right-hand directions of the vehicle and left- and right-hand directions in FIG. 2.

First, an arrangement of the power system of the vehicle is shown in FIG. 5. The power system comprises an engine 1, a transmission 3, a pair of front axles 5 and 7, a pair of left- and right-hand front wheels 9 and 11, a propeller shaft 13, a rear differential device 15 (a differential apparatus according to the embodiment, which is used on the side of rear wheels), a pair of rear axles 17 and 19, a pair of left- and right-side rear wheels 21 and 23, and the like.

The rear differential device 15 will next be described.

The rear differential device 15 has a differential case 25 which is rotatably supported within a differential carrier 27. A ring gear 29 is fixedly mounted on the differential case 25. The ring gear 29 is in mesh with a drive pinion gear 31. The drive pinion gear 31 is formed integral with a drive pinion shaft 33 which is connected to the propeller shaft 13. Thus, the differential case 25 is rotatively driven by a drive force from the engine 1.

As shown in FIG. 2, a pair of left- and right-hand hubs 35 and 37 are rotatably arranged coaxially within the differential case 25. The left-hand hub 35 is spline-connected to the left-hand rear axle 17, while the right-hand hub 37 is spline-connected to the right-hand rear axle 19.

A differential mechanism 39 of planetary gear type is arranged within the differential case 25. The differential mechanism 39 has an internal gear 41 which is formed on the differential case 25, and a sun gear 43 which is formed on the left-hand hub 35.

Figure 3:
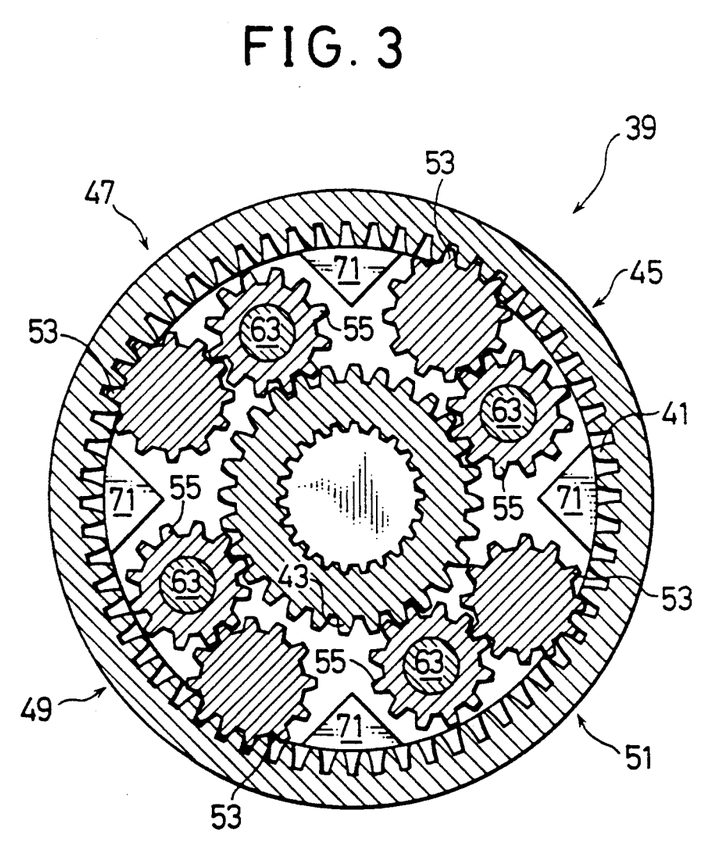
FIG. 3 is a cross-sectional view taken along the line III—III in FIG. 1.

As shown in FIG. 3, for example, four (4) pinion-gear sets 45, 47, 49 and 51 are arranged between the internal gear 41 and the sun gear 43. Each of the pinion-gear sets has a pair of outside and inside pinion gears 53 and 55 which are rotated in mesh with each other. Each outside pinion gear 53 is in mesh with the internal gear 41, while each inside pinion gear 55 is in mesh with the sun gear 43.

The outside pinion gear 53 is formed integral with a pair of left- and right-hand large-diameter shanks 57 and 57, and is rotatably supported by a pair of left- and right-hand pinion carriers 59 and 61 through the respective shanks 57 and 57. Further, the inside pinion gear 55 is rotatably supported on a pinion shaft 63 which is smaller in diameter than the shank 57. The pinion shaft 63 has both ends thereof which are fixedly caulked respectively to the pinion carriers 59 and 61. The shank 57 is larger in diameter than a pinion shaft of the conventional example to increase the frictional force.

A spiral oil groove 65 is formed in an outer periphery of the pinion shaft 63 to supply lubricating oil to a slidingly rotating section between the pinion shaft 63 and the pinion gear 55, thereby reducing the frictional force. The lubricating oil is enclosed in a differential carrier 27, and flows in and out the differential case 25 through bores 67 and 69.

The right-hand pinion carrier 61 forms a flange section of the right-hand hub 37. Moreover, the pinion carriers 59 and 61 are integral with each other by welding of an arm 71 of the right-hand pinion carrier 61 to the left-hand pinion carrier 59. Washers 73 and 74 are arranged respectively between the pinion gears 53 and 55 and the pinion carriers 59 and 61. A washer 75 is arranged between the right-hand pinion carrier 61 and the differential case 25. Washers 77 and 77 are arranged respectively between the hub 35 and the differential case 25 and between the hubs 35 and 37.

In this manner, the rear differential device 15 is arranged.

Rotation of the differential case 25 (internal gear 41) is transmitted to the pinion carrier 61 (hub 37) and the sun gear 43 (hub 35) from the pinion gears 53 and 55, and is transmitted to the left- and right-hand rear wheels 21 and 23 through the hubs 35 and 37. As a difference occurs between drive resistances of the respective rear wheels 21 and 23, the sun gear 43 and the pinion carrier 61 are differentially rotated by rotation of the pinion gears 53 and 55 about their respective axes and revolution thereof, so that the drive force of the engine 1 is outputted in division to the rear wheels 21 and 23.

As the rear differential device 15 is rotated, a resultant force of the drive force of the engine 1 and the drive resistances from the rear wheels 21 and 23 acts upon the slidingly rotating sections between the pinion gears 55 and the pinion shafts 63 and upon the slidingly rotating sections between the shanks 57 of the pinion gears 53 and the pinion carriers 59 and 61. The rotation of the pinion gears 53 and 55 about their respective axes and the revolution thereof are braked by the frictional forces (rotational resistances) of the slidingly rotating sections, so that the differential of the rear differential device 15 is limited. Accordingly, as one of the rear wheels is idle-run, the drive force is sent to the other rear wheel by the differential limiting force.

Since the above-described resultant force increases and decreases depending upon the torque acting upon each slidingly rotating section, differential limiting of the rear differential device 15 is of torque sensitive type.

A balance of the left- and right-hand differential limiting forces in the rear differential device 15 will next be described with reference to a torque distribution characteristic view of FIG. 4. In this characteristic view, an axis of ordinate indicates a left-hand rear axle torque $T_L$, while an axis of abscissa indicates a right-hand rear axle torque $T_R$. Characteristic 79 of 45° is torque distribution characteristic in the case where the differential limiting forces are zero, and indicates that, even if any one of the rear wheels 21 and 23 is idle-run, both distribution torques thereof are equal to each other.

Characteristic 81 shown by a solid line indicates a limit of torque (transfer ratio) distributed to the left-hand rear wheel 21 by the differential limiting force of the rear differential device 15 when the right-hand rear wheel 23 is idle-run, while characteristic 209 shown by a broken line indicates a transfer ratio of the conventional example in the same case. Further, characteristic 83 shown by a solid line indicates a limit of torque (transfer ratio) distributed to the right-hand rear wheel 23 by the differential limiting force of the rear differential device 15 when the left-hand rear wheel 21 is idle-run, while characteristic 211 shown by a broken line indicates a transfer ratio of the conventional example in the same case.

As indicated by the characteristics 209 and 211 (assuming that angles between the characteristics 209 and 211 and the characteristic 79 are $\alpha_1$ and $\alpha_2$, respectively), in the differential apparatus of the conventional example, the angles of the respective characteristics 209 and 211 at the time idle running occurs in the right-hand wheel and at the time idle running occurs in the left-hand wheel are $\alpha_1 >> \alpha_2$. This indicates that the transfer ratio are remarkably unbalanced so that a pull of differential limiting occurs. This is, as described above, due to a difference between the grip torque and the idle-running torque of the sun gear.

The grip torque inputted from the sun gear 43 (left-hand rear wheel 21) is influenced upon the inside pinion gear 55 stronger than the outside pinion gears 53 by the friction losses between the gears. In the rear differential device 15, however, the rotating frictional forces acting upon the inside pinion gears 55 are remarkable smaller than those acting upon the outside pinion gears 53, because the pinion shafts 63 are smaller in diameter than the shanks 57 of the respective pinion gears 53 and because of supply of the lubricating oil through the oil groove 65.

Accordingly, the rotational resistance (differential limiting force) at the time the right-hand rear wheel 23 (on the side of the pinion carrier 61) is idle-run and the left-hand rear wheel 21 (on the side of the sun gear 43) grips a road surface is reduced less than that in the conventional example so that the torque distribution to the side of the left-hand rear wheel 21 decreases, while the torque distribution to the side of the right-hand rear wheel 23 increases. Accordingly, there is produced the characteristic 81 in which an angle $\beta_1$ is smaller than $\alpha_1$ of the characteristic 209 in the conventional example.

Further, when the left-hand rear wheel 21 is idle-run, the torque distributed to the right-hand rear wheel 23 on the grip side increases in differential limiting force as a whole, because the shanks 57 of the pinion gears 53 increase more in diameter than the conventional ones. The torque distribution to the side of the left-hand rear wheel 21 decreases, while the torque distribution to the right-hand rear wheel 23 increases. Accordingly, there is produced the characteristic 83 in which an angle $\beta_2$ is larger than the angle $\alpha_2$ of the characteristic 211 in the conventional example.

Thus, $\beta_1 \approx \beta_2$, and an unbalance of the transfer ratio between the left-hand rear wheel 21 and the right-hand rear wheel 23 is dissolved as compared with the conventional example in which the difference between $\alpha_1$ and $\alpha_2$ is large, so that a pull of differential limiting is considerably corrected. Furthermore, even in the case where the transfer ratio is high (for example, even in the case where the angles $\alpha_1$ and $\alpha_2$ of the respective characteristics 209 and 211 in the conventional example are larger), the unbalance of the transfer ratio can similarly be corrected. Accordingly, there is produced the differential apparatus in which the pull is small while maintaining the transfer ratio high.

A function of the rear differential device 15 will next be described in conformity with operation performance of the vehicle illustrated in FIG. 5.

As described previously, the stronger the differential limiting force of the rear differential device 15, the higher the torque applied to the rear differential device 15. Accordingly, rectilinear advance stability of the vehicle at acceleration is improved. Further, since the rear differential device 15 is arranged such that the pull of differential limiting is small and left- and right-hand yaw-moments tending to return a yaw angle of the vehicle during rectilinear advance running are substantially uniform with each other, the differential apparatus is superior in maneuvering stability. For the same reason, there is produced steering characteristic which is superior in balance between left turn and right turn.

Furthermore, even if one of the rear wheels is idle-run on a bad road or the like, rough-road escaping performance is maintained high by the drive force sent to the other rear wheel through the rear differential device 15. This escaping performance does not change even if the idle running occurs in any one of the left- and right-hand rear wheels.

Figure 6:
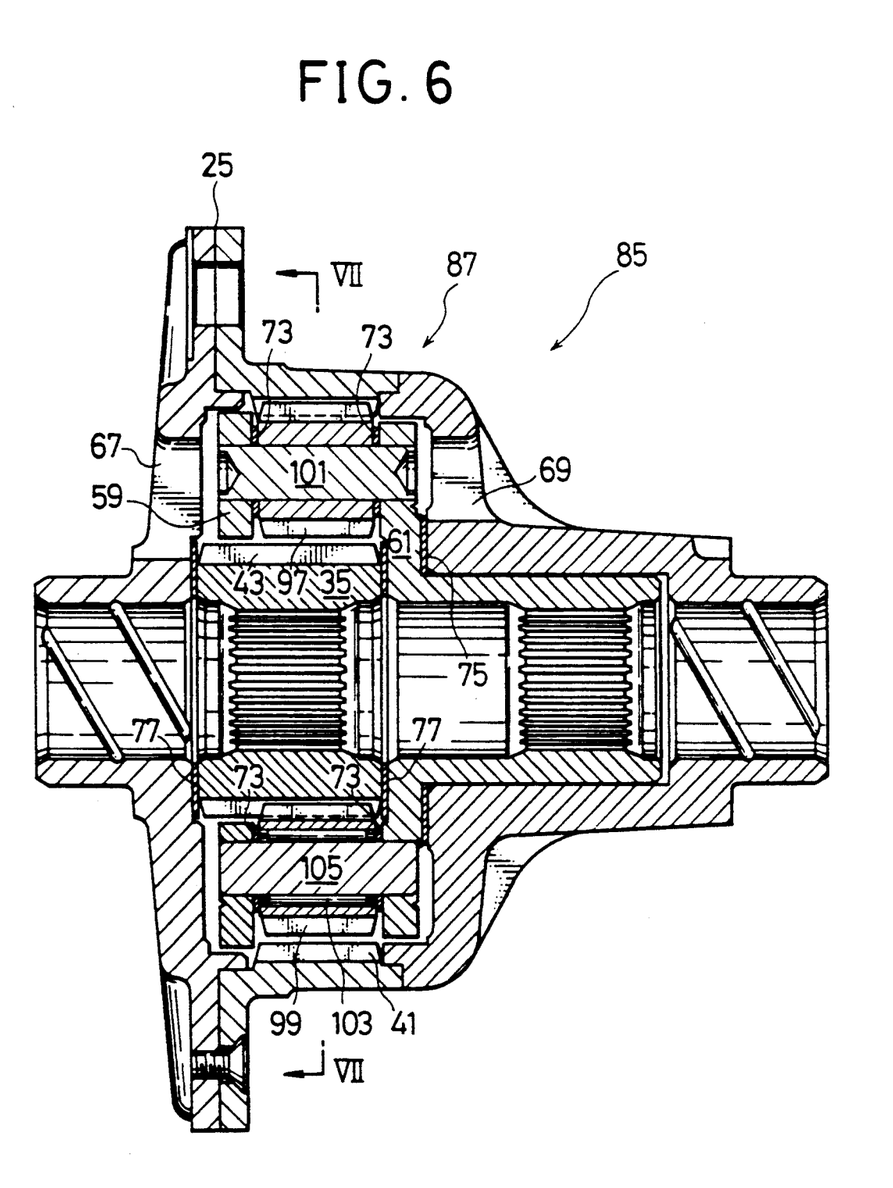
FIG. 6 is a longitudinal cross-sectional view of a second embodiment of the invention.

A second embodiment of the invention (third invention) will next be described with reference to FIGS. 6 and 7. A differential apparatus according to the embodiment is also used in a rear differential 85 of the vehicle illustrated in FIG. 5. The same or identical reference numerals are applied to components and parts the same in function as those of the first embodiment, and different points between the first and second embodiments will be described while quoting the same components and parts.

Figure 7:
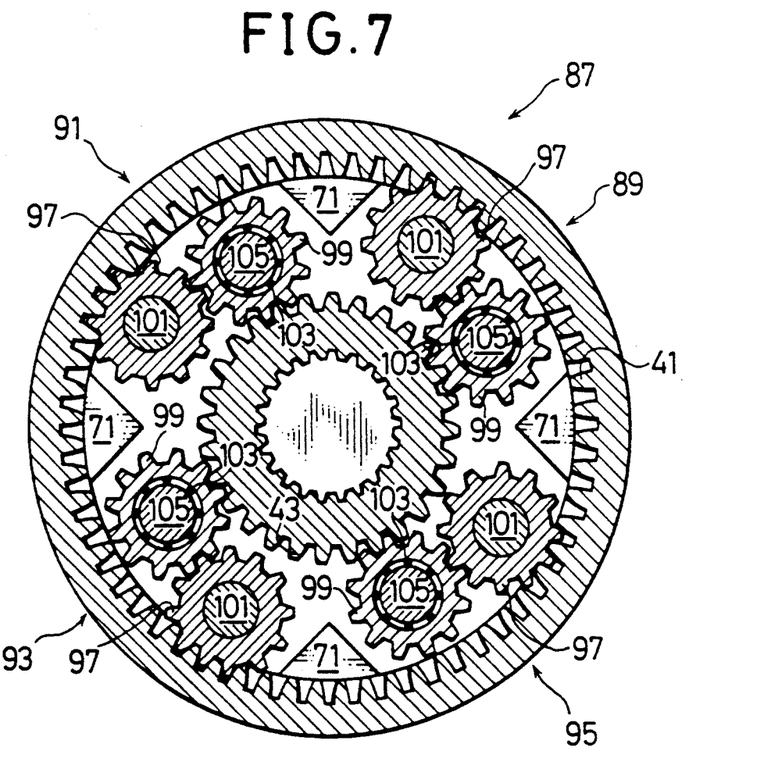
FIG. 7 is a cross-sectional view taken along the line VII—VII in FIG. 6.

As shown in FIG. 7, a differential mechanism 87 of the rear differential 85 has, for example, four (4) pinion-gear sets 89, 91, 93 and 95. Each of the gear sets includes an outside pinion gear 97 in mesh with the internal gear 41, and an inside pinion gear 99 in mesh with the pinion gear 97 and the sun gear 43.

The outside pinion gear 97 is rotatably supported on a pinion shaft 101, while the inside pinion gear 99 is supported by on a pinion shaft 105 through a needle bearing 103. Each of the pinion shafts 101 and 105 has both ends which are fixedly mounted respectively on the left- and right-hand pinion carriers 59 and 61.

A structure of the outside pinion gear 97 and the pinion shaft 101 and the coefficient of friction of each of the rotating sections are the same as those of the conventional example and, accordingly, the rotating frictional force is the same as that of the conventional example. On the other hand, the coefficient of friction between the inside pinion gear 99 and the pinion shaft 105 is considerably smaller than that on the side of the outside pinion gear 97 because of intervention of the needle bearing 103, so that the rotating frictional force is considerably small.

Accordingly, similarly to the first embodiment, a balance between the left- and right-hand transfer ratios is superior, and a pull of differential limiting with respect to the side of the left-hand rear wheel 21 is dissolved, so that there is produced a substantially uniform differential limiting force between the rear wheels 21 and 23. Further, unlike the first embodiment in which the frictional force of the outside pinion gear increases, the second embodiment reduces the frictional force on the side of the inside pinion gear 99. Accordingly, the transfer ratio is reduced as a whole, and understeer of the vehicle is prevented from occurring so that there is produced superior maneuverability.

In connection with the above, in a third invention, surface roughness of the rotating section of each of the pinion gears may be such that the outside pinion gear is rough, while the inside pinion gear is smooth.

Moreover, the differential apparatus according to the invention may be arranged such that the pinion-gear sets are formed by an even number of pinion gears more than four (4). In this case, the frictional forces of the rotating sections of the respective pinion gears are successively reduced from the outermost pinion gears to the inside pinion gears, for example, or the innermost pinion gears are sufficiently reduced less than the other pinion gears.

The differential gear according to the invention is arranged such that the rotating frictional forces of the respective pinion gears of each of the pinion-gear sets are reduced in the pinion gears on the torque output side less than the other pinion gears, and influence in which the difference between the idle-running torque and the grip torque of the sun gear or the internal gear is given to the differential limiting force is reduced. With the arrangement, a balance between the left- and right-hand transfer ratios is superior so that a pull of differential limiting is prevented from occurring.

What is claimed is:

1. A differential apparatus of planetary gear type, for use in a vehicle having an axle, said differential apparatus comprising:
    an internal gear;
    a sun gear arranged adjacent to said axle, and arranged inside said internal gear in concentric relation thereto;
    a plurality of pinion gear sets each having an even number of pinion gears rotated in mesh with each other, ones of said pinion gears being in mesh with said internal gear, while the remaining pinion gears are in mesh with said sun gear; and
    a pinion carrier for rotatably supporting said pinion gears,
    wherein a torque is input from one of said internal gear and said sun gear to the pinion gear sets and is outputted to the other of said internal gear and said sun gear, and
    wherein the pinion gears are configured so that a rotating frictional force between the pinion gears on which the torque is output and said pinion carrier is smaller than that between each of the remaining pinion gears and said pinion carrier.

2. A differential apparatus according to claim 1 wherein the pinion gears on which the torque is output are smaller in diameter than the remaining pinion gears.

3. A differential apparatus of planetary gear type, for use in a vehicle having an axle, said differential apparatus comprising:
    an internal gear;
    a sun gear arranged adjacent to said axle, and arranged inside said internal gear in concentric relation thereto;
    a plurality of pinion gear sets each having an even number of pinion gears rotated in mesh with each other, ones of said pinion gears being in mesh with said internal gear, while the remaining pinion gears are in mesh with said sun gear; and
    a pinion carrier for rotatably supporting said pinion gears, wherein a torque is input from one of said internal gear and said sun gear to the pinion gear sets and is outputted to the other of the internal gear and said sun gear, wherein a coefficient of friction between contiguous surfaces of the pinion carrier and of each of the pinion gears on the side where the torque is output is smaller than a coefficient of friction between contiguous surfaces of the pinion carrier and each of the remaining pinion gears.

4. A differential apparatus of planetary gear type, for use in a vehicle having an axle, said differential apparatus comprising:
    an internal gear from which a torque is inputted;
    a sun gear arranged adjacent to said axle, and arranged inside said internal gear in concentric relation thereto, from which the torque is output;
    a plurality of first pinion gears arranged on the radially outside, being in mesh with said internal gear respectively,
    a plurality of second pinion gears arranged on the radially inside, being in mesh with said first pinion gears and said sun gear respectively; and
    a pinion carrier for rotatably supporting said first and second pinion gears,
    wherein a rotating frictional force between said second pinion gears and said pinion carrier is reduced less than that between said first pinion gears and said pinion carrier.

5. A differential apparatus according to claim 4, wherein said first and second pinion gears have a shank respectively, the shanks of said second pinion gears are smaller in diameter than those of said first pinion gears.

6. A differential apparatus according to claim 4, wherein a coefficient of friction between said second pinion gears and said pinion carrier is smaller than that between first pinion gears and said pinion carrier.

7. A differential apparatus of planetary gear type, for use in a vehicle having an axle, said differential apparatus comprising:
    an internal gear from which a torque is output;
    a sun gear arranged adjacent to said axle, arranged inside said internal gear in concentric relation thereto, to which the torque is input;
    a plurality of first pinion gears arranged on the radially outside, being in mesh with said internal gear respectively,
    a plurality of second pinion gears arranged on the radially inside, being in mesh with said first gears and said sun gear respectively; and
    a pinion carrier for rotatably supporting said first and second pinion gears,
    wherein a rotating frictional force between said first pinion gears and said pinion carrier is smaller than that between said second pinion gears and said pinion carrier.

8. A differential apparatus according to claim 7, wherein said first and second pinion gears have a shank respectively, the shanks of said first pinion gears are smaller in diameter than those of said second pinion gears.

9. A differential apparatus according to claim 7, wherein a coefficient of friction between said first pinion gears and said pinion carrier is smaller than that between said second pinion gears and said pinion carrier.

10. A differential apparatus of planetary gear type comprising:
    an internal gear;
    a sun gear disposed concentric to the internal gear;
    an outside pinion gear meshing with the internal gear, having a pair of shank portions on ends, each of the shank portions having a shank diameter;

an inside pinion gear meshing with the outside pinion gear and the sun gear, the inside pinion gear having a shaft, the shaft having a shaft diameter; and a pinion carrier for rotatably supporting the outside and the inside pinion gears, wherein the shaft diameter is smaller than the shank diameter.

11. A differential apparatus of planetary gear type comprising:

an internal gear;

a sun gear disposed concentric to the internal gear;

an outside pinion gear meshing with the internal gear, having a pair of shank portions on ends, each of the shank portions having a shank diameter;

an inside pinion gear meshing with the outside pinion gear and the sun gear, the inside pinion gear having a shaft, the shaft having a shaft diameter; and a pinion carrier for rotatably supporting the outside and the inside pinion gears, wherein the shaft diameter is smaller than the shank diameter, and wherein the inside pinion gear further comprises oil grooves on the surface of the shaft.

12. A differential apparatus of planetary gear type comprising:

an internal gear;

a sun gear disposed concentric to the internal gear;

an outside pinion gear meshing with the internal gear, having a pair of shank portions on ends, each of the shank portions having a shank diameter;

an inside pinion gear meshing with the outside pinion gear and the sun gear, the inside pinion gear having a shaft, the shaft having a shaft diameter; and a pinion carrier for rotatably supporting the outside and the inside pinion gears, wherein the shaft diameter is smaller than the shank diameter, and wherein the inside pinion gear further comprises needle bearings disposed concentric with the shaft.

13. A differential apparatus of planetary gear type, for use in a vehicle having an axle, said differential apparatus comprising:

an internal gear;

a sun gear arranged adjacent to said axle, and arranged inside said internal gear in concentric relation thereto;

a plurality of pinion gear sets each having an even number of pinion gears rotated in mesh with each other, ones of said pinion gears being in mesh with said internal gear, while the remaining pinion gears are in mesh with said sun gear; and a pinion carrier for rotatably supporting said pinion gears, wherein a torque is input from one of said internal gear and said sun gear to the pinion gear sets and is outputted to the other of said internal gear and said sun gear, and wherein said pinion gears have a shank respectively, the shanks of said pinion gears on which the torque is outputted are smaller in diameter than the shanks of the remaining pinion gears.

* * * * *